(12) United States Patent
Mikawa

(10) Patent No.: US 11,681,487 B2
(45) Date of Patent: Jun. 20, 2023

(54) ELECTRONIC APPARATUS AND CONTROL METHOD THEREOF AND STORAGE MEDIUM

(71) Applicant: CANON KABUSHIKI KAISHA, Tokyo (JP)

(72) Inventor: Atsushi Mikawa, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/712,262

(22) Filed: Apr. 4, 2022

(65) Prior Publication Data
US 2022/0326899 A1 Oct. 13, 2022

(30) Foreign Application Priority Data
Apr. 12, 2021 (JP) .............................. JP2021-067242

(51) Int. Cl.
*G06F 3/14* (2006.01)
*G06F 3/0346* (2013.01)
*G06F 3/04883* (2022.01)

(52) U.S. Cl.
CPC .............. *G06F 3/14* (2013.01); *G06F 3/0346* (2013.01); *G06F 3/04883* (2013.01)

(58) Field of Classification Search
CPC ....... G06F 3/14; G06F 3/0346; G06F 3/04883
See application file for complete search history.

(56) References Cited

U.S. PATENT DOCUMENTS

| 2016/0328868 | A1* | 11/2016 | Tran ....................... G06T 11/60 |
| 2017/0238043 | A1* | 8/2017 | Zvinakis .......... H04N 21/41407 |
| | | | 725/38 |
| 2018/0164876 | A1* | 6/2018 | Smit ........................ G06F 3/011 |
| 2019/0083885 | A1* | 3/2019 | Yee .......................... A63F 13/92 |
| 2020/0363947 | A1* | 11/2020 | Ikuta ....................... G06F 3/0488 |
| 2021/0064322 | A1* | 3/2021 | Lim ....................... G06F 1/1649 |
| 2022/0116581 | A1* | 4/2022 | Miyata ................... G06F 3/0481 |

FOREIGN PATENT DOCUMENTS

JP 2019-057291 A 4/2019

* cited by examiner

*Primary Examiner* — Ryan A Lubit
(74) *Attorney, Agent, or Firm* — Cowan, Liebowitz & Latman, P.C.

(57) ABSTRACT

An electronic apparatus comprising a processor and a memory storing a program which, when executed by the processor, causes the electronic apparatus to: acquire a plurality of images obtained from a plurality of different image sources; store information about relationship between an orientation of a display device and at least one of the plurality of images in a storage; detect an orientation of a display device; and control the display device to display an image obtained from a same image source, among the plurality of different image sources, as that of an image associated with the detected orientation.

13 Claims, 17 Drawing Sheets

| IMAGE DATA DISPLAY AREA | PRIORITY IN PORTRAIT DISPLAY MODE | AUDIO RATIO IN PORTRAIT DISPLAY MODE | PRIORITY IN LANDSCAPE DISPLAY MODE | AUDIO RATIO IN LANDSCAPE DISPLAY MODE |
|---|---|---|---|---|
| MAIN | 1 | 70% | 2 | 30% |
| SUB | 2 | 30% | 1 | 70% |

F I G. 1
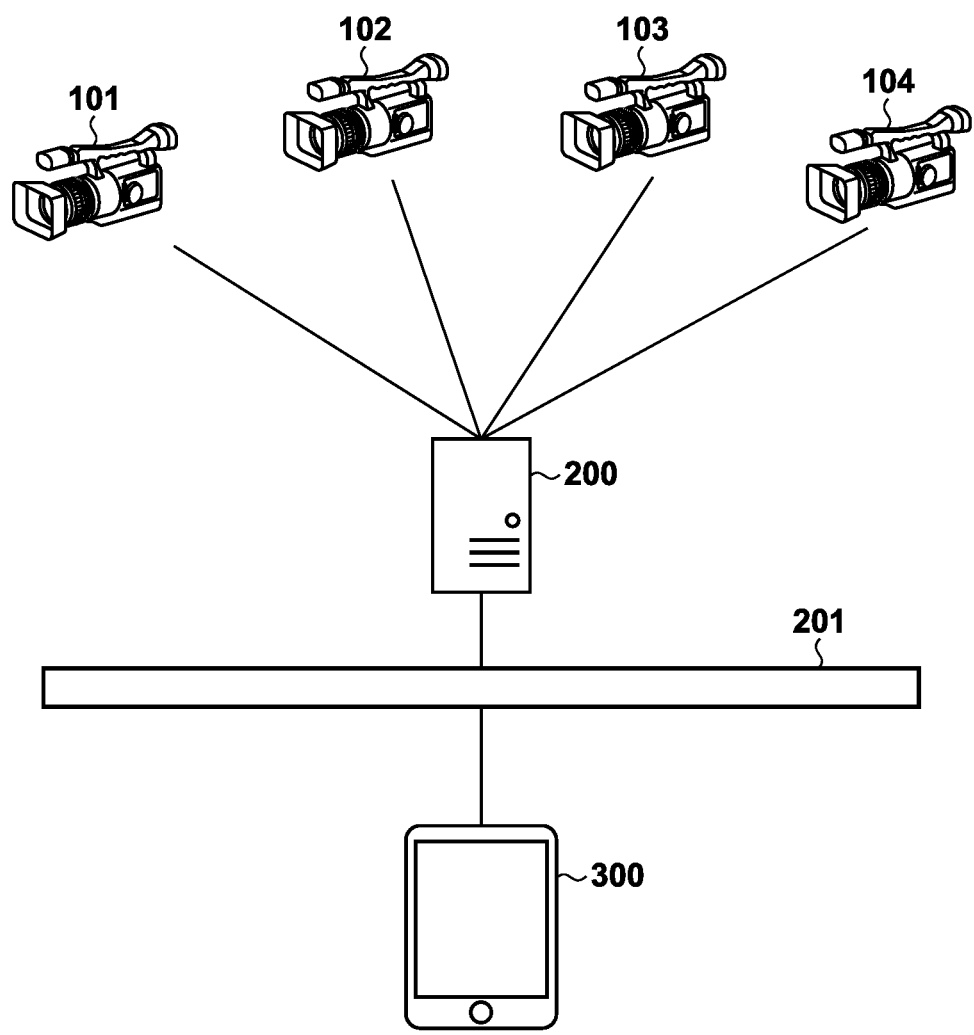

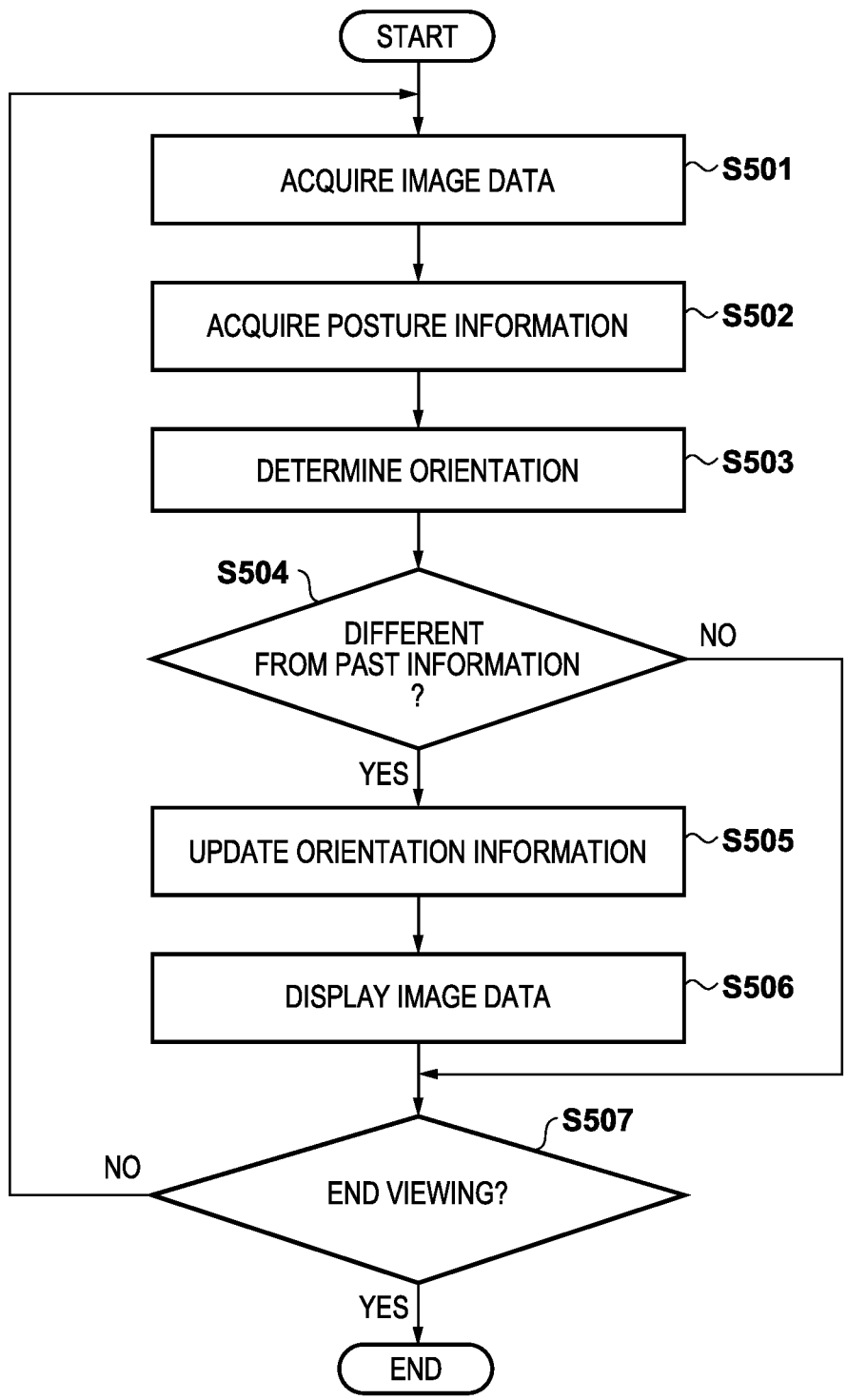

FIG. 8

|  | PRIORITY IN LANDSCAPE DISPLAY MODE | PRIORITY IN PORTRAIT DISPLAY MODE |
|---|---|---|
| IMAGE DATA A | — | 3 |
| IMAGE DATA B | 2 | — |
| IMAGE DATA C | 1 | 2 |
| IMAGE DATA D | — | 1 |
| IMAGE DATA E | 3 | 4 |

| DISPLAY AREA | PORTRAIT/LANDSCAPE | PRIORITY |
|---|---|---|
| 5011 | PORTRAIT | 1 |
| 5012 | LANDSCAPE | 1 |
| 5013 | LANDSCAPE | 2 |

FIG. 13

|  | LAYOUT CANDIDATE 1 | | LAYOUT CANDIDATE 2 | | LAYOUT CANDIDATE 3 | |
|---|---|---|---|---|---|---|
|  | LANDSCAPE | PORTRAIT | LANDSCAPE | PORTRAIT | LANDSCAPE | PORTRAIT |
| IMAGE DATA A | 4 | 2 | 5 | 1 | 4 | 5 |
| IMAGE DATA B | 2 | 5 | 4 | 2 | 2 | 3 |
| IMAGE DATA C | 3 | 1 | 3 | 3 | 1 | 2 |
| IMAGE DATA D | 1 | 4 | 2 | 4 | 5 | 1 |
| IMAGE DATA E | 5 | 3 | 1 | 5 | 3 | 4 |

F I G. 17

| IMAGE DATA DISPLAY AREA | PRIORITY IN PORTRAIT DISPLAY MODE | AUDIO RATIO IN PORTRAIT DISPLAY MODE | PRIORITY IN LANDSCAPE DISPLAY MODE | AUDIO RATIO IN LANDSCAPE DISPLAY MODE |
|---|---|---|---|---|
| MAIN | 1 | 70% | 2 | 30% |
| SUB | 2 | 30% | 1 | 70% |

ELECTRONIC APPARATUS AND CONTROL METHOD THEREOF AND STORAGE MEDIUM

BACKGROUND OF THE INVENTION

Field of the Invention

The present invention relates to an electronic apparatus and control method thereof, and a storage medium, and more particularly to a display control technique of displaying images shot by a plurality of image capturing apparatuses.

Description of the Related Art

As a conventional method of viewing image contents, there are common methods of editing image/images shot by one or more cameras and distributing it/them as one content, and of distributing a live broadcast while switching images shot by a plurality of cameras. In particular, in recent years, not only horizontally long images suitable for TV screens, but also vertically long images suitable for vertically long terminals such as smartphones and tablets have been distributed in social network services (SNS) and moving image distribution services.

In addition to a service that allows viewing of single-viewpoint image data shot by one camera, there are services that allow simultaneous viewing of multiple viewpoints image data shot by a plurality of cameras. In the latter services, there are a service that allows viewing of a free-viewpoint image which is an image that can be viewed from a free viewpoint by synthesizing images, and a service that distributes images of multiple viewpoints as they are without synthesizing the images (for example, see Japanese Patent Laid-Open No. 2019-057291). In addition, a horizontally long image showing the entire angle of view and a vertically long image focusing on a person are simultaneously distributed, and the user can select the image he/she wants to see and enjoy it at the angle of view he/she wants to see.

However, while multi-viewpoint images including a horizontally long image showing the entire angle of view and a vertically long image focusing on a person are being distributed, it is troublesome to select the image data he/she wants to see and change the screen layout that matches the size of the image data. For example, it is necessary to change the setting of the display direction of the viewing terminal or the direction of the terminal itself, and there is a problem that the user may miss a critical scene while performing such an operation.

SUMMARY OF THE INVENTION

The present invention has been made in consideration of the above situation, a user can easily see an image of image data he/she want to see in a desired screen layout.

According to the present invention, provided is an electronic apparatus comprising a processor and a memory storing a program which, when executed by the processor, causes the electronic apparatus to: acquire a plurality of images obtained from a plurality of different image sources; store information about relationship between an orientation of a display device and at least one of the plurality of images in a storage; detect an orientation of a display device; and control the display device to display an image obtained from a same image source, among the plurality of different image sources, as that of an image associated with the detected orientation.

Further, according to the present invention, provided is a control method of an electronic apparatus comprising: acquiring a plurality of images obtained from a plurality of different image sources; storing information about relationship between an orientation of a display device and at least one of the plurality of images in a storage based on an operation by an operation unit; detecting an orientation of the display device; and displaying on the display device an image obtained from a same image source, among the plurality of different image sources, as that of an image associated with the detected orientation.

Furthermore, according to the present invention, provided is a non-transitory computer-readable storage medium, the storage medium storing a program that is executable by the computer, wherein the program includes program code for causing the computer to function as an electronic apparatus comprising: an acquisition unit that acquires a plurality of images obtained from a plurality of different image sources; a display device; a storage that stores information about relationship between an orientation of the display device and at least one of the plurality of images based on an operation by an operation unit; a detector that detect an orientation of the display device; and a controller that controls the display device to display an image obtained from a same image source, among the plurality of different image sources, as that of an image associated with the detected orientation.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 1 is a diagram showing a configuration example of an image distribution system according to an embodiment of the present invention.

FIG. 5 is a flowchart of image display processing according to the first embodiment.

FIG. 8 is a diagram showing an example of priority of image data according to the second embodiment.

FIG. 13 is a diagram showing an example of priority of image data according to a modification of the third embodiment.

FIG. 17 is a diagram showing an example of audio information associated with image data and a priority for each mode according to the fourth embodiment.

DESCRIPTION OF THE EMBODIMENTS

Figure 2:
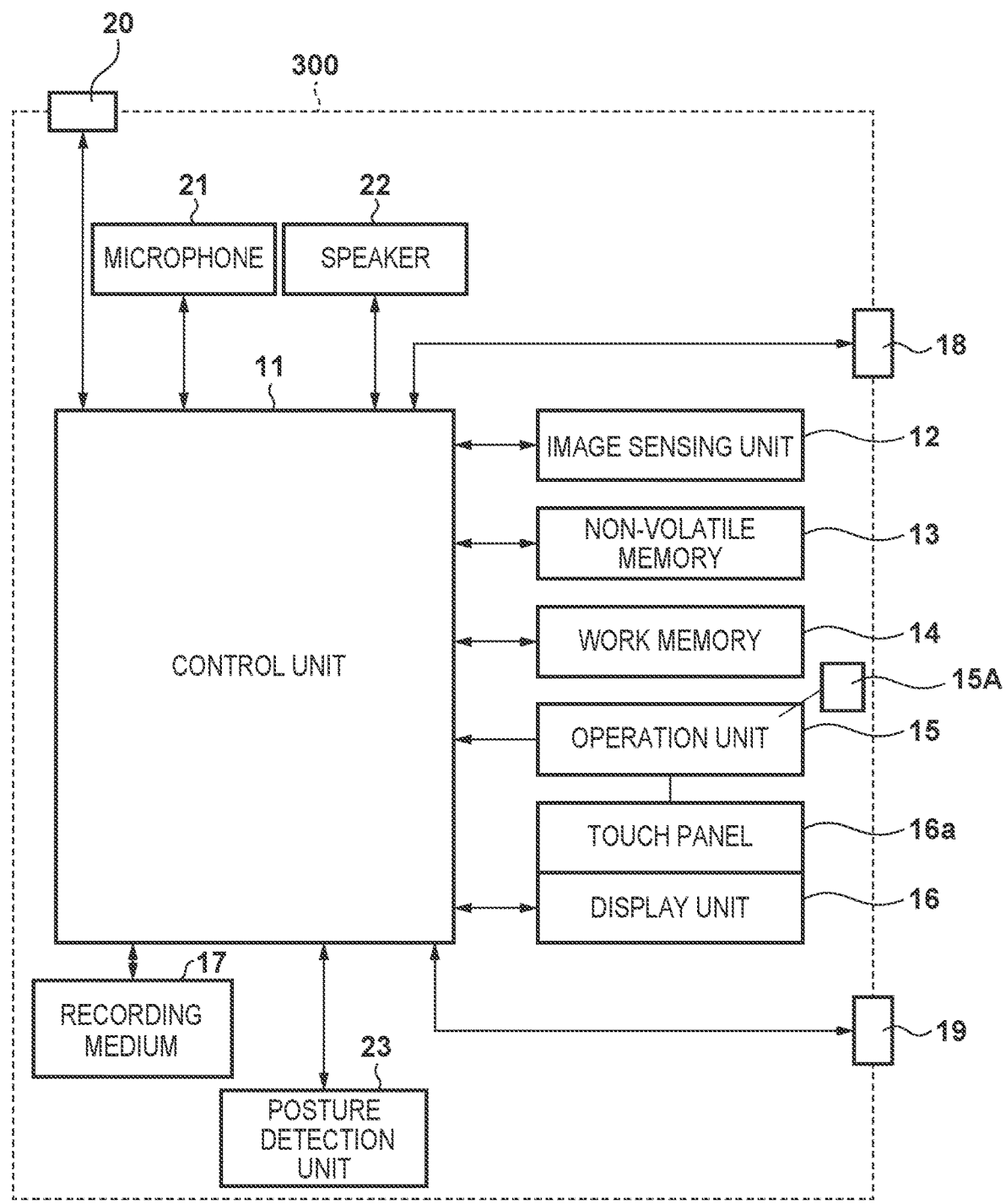
FIG. 2 is a block diagram showing a configuration example of an electronic device according to the embodiment.

Hereinafter, embodiments will be described in detail with reference to the attached drawings. Note, the following embodiments are not intended to limit the scope of the claimed invention, and limitation is not made an invention that requires a combination of all features described in the embodiments. Two or more of the multiple features described in the embodiments may be combined as appropriate. Furthermore, the same reference numerals are given to the same or similar configurations, and redundant description thereof is omitted.

FIG. 1 is a diagram showing a configuration example of an image distribution system according to the present embodiment. Video cameras 101 to 104 record image signals and output the image signals to an electronic device 200 connected wirelessly or via wire. The electronic device 200 edits the image signals received from the video cameras 101 to 104, regarding image quality, audio, and subtitles, and distributes the created image data via a communication network 201 such as the Internet. The electronic device 200 may distribute the image signals received from the video cameras 101 to 104 as they are without editing them.

An electronic device 300 displays and reproduces the image data received via the communication network 201 on the screen of its display unit. Here, the electronic device 300 is shown as an example of an information processing device, but any terminal having a display unit capable of displaying image contents, such as a digital camera having a wireless communication function, a tablet device, and a personal computer, may be used.

FIG. 2 is a block diagram showing a configuration example of the electronic device 300, which is an example of the information processing apparatus of the present embodiment, and constitutes the system shown in FIG. 1.

A control unit 11 controls each constituent of the electronic device 300 in accordance with an input signal and a program stored in a non-volatile memory 13 described later. Instead of the control unit 11 controlling the entire device, a plurality of hardware may share the processing to control the entire device.

An image sensing unit 12 converts the light from a subject formed by lenses included in the image sensing unit 12 into an electric signal, performs noise reduction processing, and outputs digital data as image data. The captured image data is stored in a buffer memory, undergoes a predetermined processing by the control unit 11, and is recorded in a recording medium 17.

The non-volatile memory 13 is a non-volatile memory that can be electrically erased and recorded. In the non-volatile memory 13, an operating system (OS), which is the basic software executed by the control unit 11, and applications that realize application functions in cooperation with this OS are recorded. Further, in the present embodiment, the non-volatile memory 13 stores an application for communicating with the electronic device 200.

A work memory 14 is used as an image display memory of a display unit 16, a work area of the control unit 11, and the like.

An operation unit 15 is used to receive an instruction to the electronic device 300 from a user. The operation unit 15 includes, for example, a power button with which the user instructs to turn on/off the power of the electronic device 300, and an operation member such as a touch panel 16a.

The touch panel 16a may be any of various touch panels such as a resistive touch panel, a capacitive touch panel, a surface acoustic wave touch panel, an infrared touch panel, an electromagnetic induction type touch panel, an image recognition type touch panel, and an optical sensor touch panel. Depending on the type of touch panels, some touch panels detect a touch by detecting an actual contact with the touch panel, and other touch panels detect a touch by detecting approach of a finger or a pen to the touch panel, and a touch panel of any of these types may be used.

The touch panel 16a and display unit 16 can be configured integrally. For example, the touch panel 16a is configured such that its light transmittance does not interfere with the displayed contents of the display unit 16 and is provided on the upper layer of the display surface of the display unit 16. Then, the coordinates of a touch position on the touch panel 16a are associated with the coordinates of the display screen of the display unit 16. This makes it possible to provide a graphical user interface (GUI) as if the user can directly operate an image displayed on the display unit 16. The control unit 11 can detect an operation on the touch panel 16a or a status of the touch panel 16a.

The display unit 16 displays image data and character strings for interactive operations.

A recording medium 17 can record the image data output from the image sensing unit 12. The recording medium 17 may be configured so as to be detachable from the electronic device 300 or may be built in the electronic device 300. That is, the electronic device 300 may have at least a means for accessing the recording medium 17.

A communication unit 18 is an interface for connecting to an external device. The electronic device 300 of the present embodiment can exchange data with the electronic device 200 via the communication unit 18. In the present embodiment, the communication unit 18 is an antenna, and the control unit 11 can be connected to the electronic device 200 via the antenna. The connection between the electronic device 300 and the electronic device 200 may be direct, or may be indirect via an access point. As a protocol for communicating data, for example, PTP/IP (Picture Transfer Protocol over Internet Protocol) via a wireless LAN may be used. The way to communicate with the electronic device 200 is not limited to this. For example, the communication unit 18 may include an infrared communication module, a Bluetooth (registered trademark) communication module, a wireless communication module such as WirelessUSB, or the like. Further, a wired connection such as a USB cable, HDMI (registered trademark), IEEE 1394, etc. may be adopted.

A short-range wireless communication unit 19 is a communication unit for realizing non-contact short-range communication with another device. The short-range wireless communication unit 19 includes an antenna for wireless communication, a modulation/demodulation circuit for processing a wireless signal, and a communication controller. The short-range wireless communication unit 19 realizes non-contact short-range communication by outputting a modulated wireless signal from the antenna and demodulating a wireless signal received from the antenna. Here, non-contact communication according to the ISO/IEC 18092 standard (so-called NFC (registered trademark)) is realized.

When the short-range wireless communication unit 19 receives a data read request from another device, the short-range wireless communication unit 19 outputs response data based on the data stored in the non-volatile memory 13. In the present embodiment, the electronic device 300 operates in the card reader mode, the card writer mode, and the P2P mode defined by the NFC (registered trademark) standard through the short-range wireless communication unit 19, and mainly acts as an initiator. On the other hand, in the card emulation mode, the electronic device 300 behaves mainly as a target via the short-range wireless communication unit 19.

Alternatively, the short-range wireless communication unit 19 outputs a modulated wireless signal from the antenna and demodulates a wireless signal received from the antenna to realize short-range wireless communication according to the IEEE802.15 standard. In this embodiment, the short-range wireless communication unit 19 communicates with other devices according to the IEEE802.15.1 standard (so-called Bluetooth). Further, in the present embodiment, Bluetooth communication adopts version 4.0 (BLE) of Bluetooth Low Energy, which requires low power consumption.

A public network communication unit 20 is an interface used when performing public wireless communication. The electronic device 300 can make a telephone call to other devices via the public network communication unit 20. At this time, the control unit 11 realizes a telephone call by inputting and outputting an audio signal via a microphone 21 and a speaker 22, respectively. In the present embodiment, the public network communication unit 20 is an antenna, and the control unit 11 can be connected to the public network communication network via the antenna. The communication unit 18 and the public network communication unit 20 may share one antenna.

A posture detection unit 23 detects the posture of the electronic device 300 with respect to the direction of gravity. Based on the posture detected by the posture detection unit 23, it is possible to determine whether the image taken by the image sensing unit 12 is an image taken by holding the electronic device 300 horizontally or an image taken by holding the electronic device 300 vertically. The control unit 11 can add orientation information according to the posture detected by the posture detection unit 23 to the image file of an image taken by the image sensing unit 12, or can rotate the image and record it.

As the posture detection unit 23, an acceleration sensor, a gyro sensor, or the like may be used. The posture detection unit 23 can also detect the movement of the electronic device 300 (pan, tilt, roll, lift, whether it is stationary, etc.) using the accelerometer or the gyro sensor.

First Embodiment

Setting Display Priorities on Images

Figure 3:
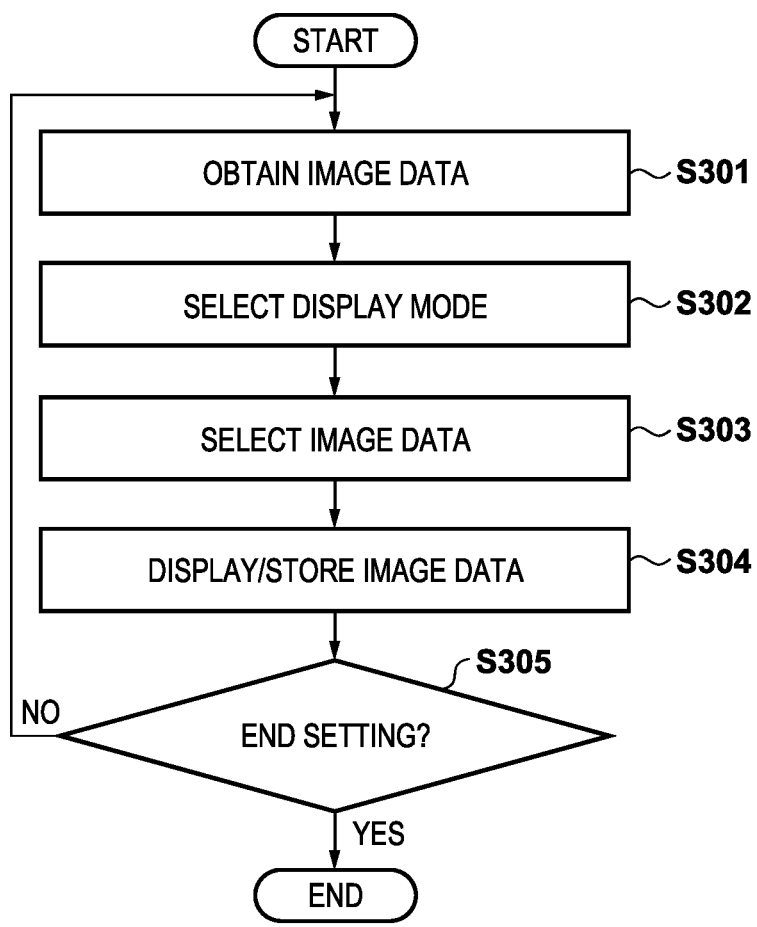
FIG. 3 is a flowchart of priority setting processing according to a first embodiment.

FIG. 3 is a flowchart of priority setting processing performed by the electronic device 300 according to a first embodiment, and each process of this processing is performed by the control unit 11 by expanding a program stored in the non-volatile memory 13 into the work memory 14. It should be noted that the priority setting processing is executed when, for example, "set display priorities" is displayed as one of the menu options and this option is selected via the operation unit 15.

In step S301, the control unit 11 receives one or more image data taken by at least one of the video cameras 101 to 104 delivered from the electronic device 200 via the communication network 201 and holds it in the work memory 14 in the main body.

The image data stored in the work memory 14 is not limited to the received image data distributed by the electronic device 200. Specifically, the image data may be those taken by an in-camera or an out-camera built in the electronic device 300.

In step S302, the control unit 11 acquires the orientation of the display unit 16 that performs the priority setting processing selected via the operation unit 15 and stores it in the work memory 14. Specifically, stored information is an orientation, such as a portrait orientation, a landscape orientation, and so on, and is hereinafter referred to as a portrait display mode and a landscape display mode, respectively.

In step S303, the control unit 11 reads out the image data held in the work memory 14, displays it on the display unit 16, and displays a screen used for setting display priorities on image data in each display mode.

Figure 4:
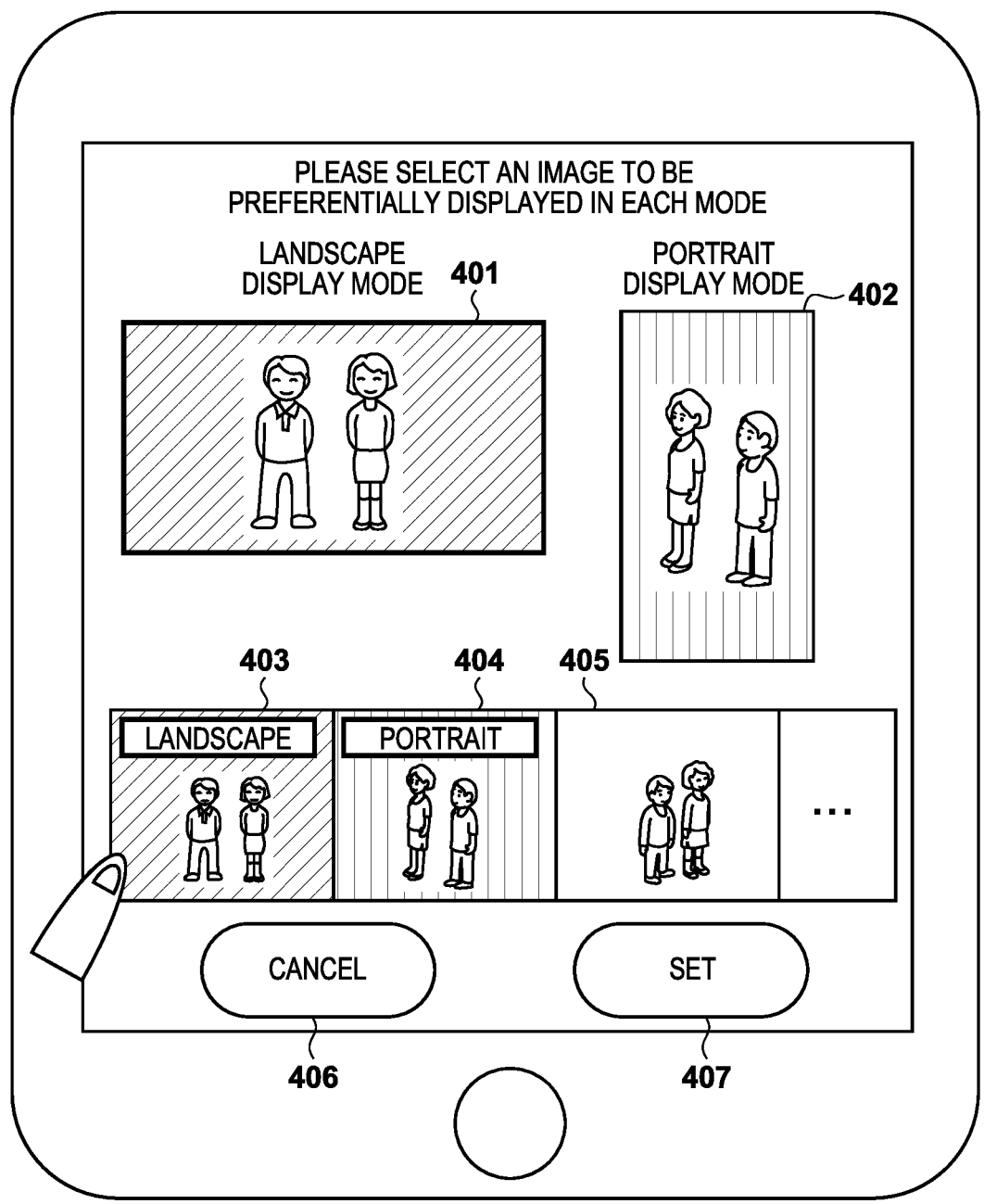
FIG. 4 is a diagram showing an example of a screen for the priority setting processing according to the first embodiment.

FIG. 4 is a diagram showing an example of a screen for the priority setting processing for setting image data to be preferentially displayed in the portrait display mode and the landscape display mode. A window 401 is a window for the landscape display mode, and a window 402 is a window for the portrait display mode. An image to be preferentially displayed on the display unit 16 when the electronic device 300 is determined to be in the portrait display mode or the landscape display mode, respectively, is displayed in the corresponding window. Images 403, 404, and 405 are images of image data taken by the different video cameras 101 to 104, a camera built in the electronic device 300, or the like and acquired in step S301. First, the user selects the area of the window 401 or 402 via the operation unit 15, and then reselects one of the images 403, 404, 405. By doing so, it is possible to specify the image data to be preferentially displayed in the landscape display mode or the portrait display mode corresponding to the selected window 401 or 402.

At this time, the image data displayed as the images 403, 404, and 405 are not limited to the image data acquired in step S301, and the image data acquired in the past and stored in the work memory 14 may be displayed, for example, in chronological order. By doing so, the image data taken by the video camera and viewed in the past can be retroactively set, and the image data from the video camera intended by the user can be easily fixed in a display area.

In step S304, the control unit 11 displays the image selected in step S303 in the window 401 or 402, and stores the information of the image data of the selected image in the work memory 14 in association with the display mode.

In step S305, the control unit 11 determines whether or not to end the priority setting processing. Here, in a case where a "Cancel" button 406 or a "Set" button 407 is pressed, it is determined that the processing ends. If the "Cancel" button 406 is pressed, the set contents are discarded, and if the "Set" button 407 is pressed, the set contents are saved and the processing ends.

If neither the "Cancel" button 406 nor the "Set" button 407 is pressed, the processing returns to step S301, assuming that the priority setting processing continues.

Displaying Image with Priority

Next, the display processing of the image data set to be preferentially displayed in each display mode as described above will be described with reference to FIG. 5. Each process is executed by the control unit 11 expanding a program stored in the non-volatile memory 13 to the work memory 14.

In step S501, the control unit 11 acquires one or more image data taken by at least one of the video cameras 101 to 104 and distributed from the electronic device 200 via the communication network 201, image data stored in the electronic device 300, and so on. Then, the image data held in the work memory 14 in the main body is updated with the acquired image data.

In step S502, the control unit 11 acquires a value of posture information from the posture detection unit 23 and stores it in the work memory 14.

In step S503, the control unit 11 acquires the value of the posture information stored in the work memory 14 and determines the posture of the electronic device 300. Table 1 is a table showing an example of the criteria for determining the posture of the electronic device 300 based on the posture information.

TABLE 1

| Posture Information | −100 to 100 | 101 to 300 | 301 to 400, −301 to −400 | −101 to −300 |
|---|---|---|---|---|
| Orientation | Portrait (upright) | Landscape (clockwise) | Portrait (upside down) | Landscape (anticlockwise) |

If the posture information of the electronic device 300 indicates a value between −100 and 100, it is determined to be the portrait orientation, and if it indicates a value between 101 to 300, it is determined to be the landscape orientation (clockwise). Further, if it indicates a value between 301 to 400, and between −301 and −401, it is determined to be a portrait orientation (upside down), and if it indicates a value between −101 to −300, it is determined to be a landscape orientation (counterclockwise). Then, the judged result is stored in the work memory 14 as the latest orientation information of the electronic device 300. The orientation information is not limited to portrait and landscape, and may be in a plurality of orientations.

Next, in step S504, the control unit 11 compares the past orientation information of the electronic device 300 with the latest orientation information of the electronic device 300 stored in the work memory 14 in the immediately preceding step S503, and if they are different, the process proceeds to step S505, if they are the same, the process proceeds to step S507.

In step S505, the control unit 11 overwrites the past orientation information of the electronic device 300 stored in the work memory 14 with the latest orientation information of the electronic device 300 stored in the work memory 14 in step S503.

In step S506, the control unit 11 displays, on the display unit 16, an image of image data obtained from the same image source as that of the image data set by the processing described in FIG. 3 according to the latest orientation information of the electronic device 300 stored in the work memory 14.

In step S507, the control unit 11 determines whether or not to end the viewing. The end-viewing determination is performed by the user, for example, via a touch operation on the touch panel 16a of the operation unit 15.

An example of images preferentially displayed in the image display processing shown in FIG. 5 will be explained with reference to FIGS. 6A and 6B.

Figure 6A:
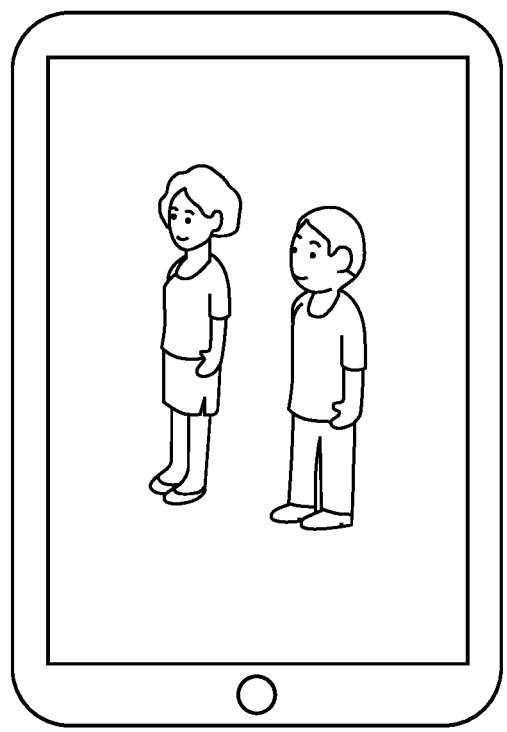
FIGS. 6A and 6B are diagrams showing examples of displayed images on a screen according to the first embodiment.

As shown in FIG. 6A, when the portrait orientation is set as the orientation information of the electronic device 300, the image data obtained from the same image source as that of the image data of the image 404 set in the portrait display mode in FIG. 4 is displayed.

Figure 6B:
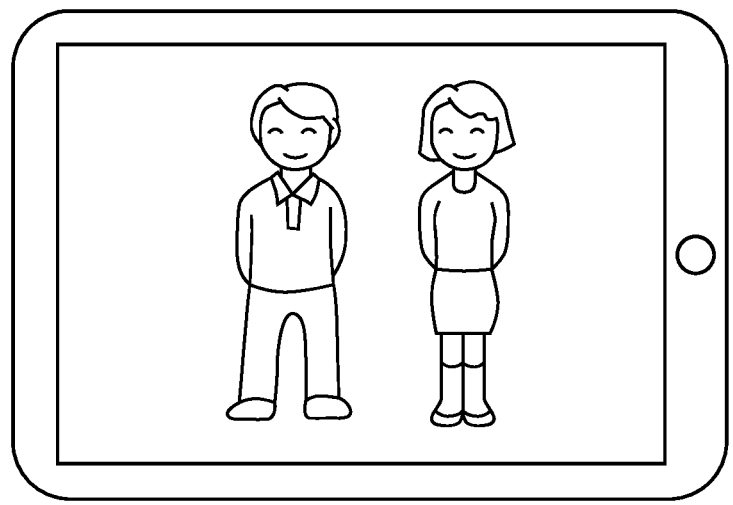

When the orientation of the electronic device 300 is changed from this state to the landscape orientation (YES in step S504), the orientation information of the electronic device 300 is changed (step S505), and as shown in FIG. 6B, the image to be displayed is changed to the image data obtained from the same image source as that of the image data of the image 403 set in the landscape display mode in FIG. 4 (step S506).

As described above, according to the first embodiment, it is possible to switch to the desired image data set in advance in conjunction with the change of the screen orientation of the terminal.

In addition, the image data to be displayed on the screen of the terminal may correspond to the orientation information of the electronic device 300, and when the display unit 16 is in landscape orientation, the horizontally long image data may be automatically displayed, and when the display unit 16 is in portrait orientation, the vertically long image data may be automatically displayed. By doing so, the image data to be displayed in the display area can be displayed without trimming or resizing, so that the image data can be displayed in the display area of the display unit 16 without losing any information about image data.

Second Embodiment

Next, a second embodiment of the present invention will be described.

Figure 7:
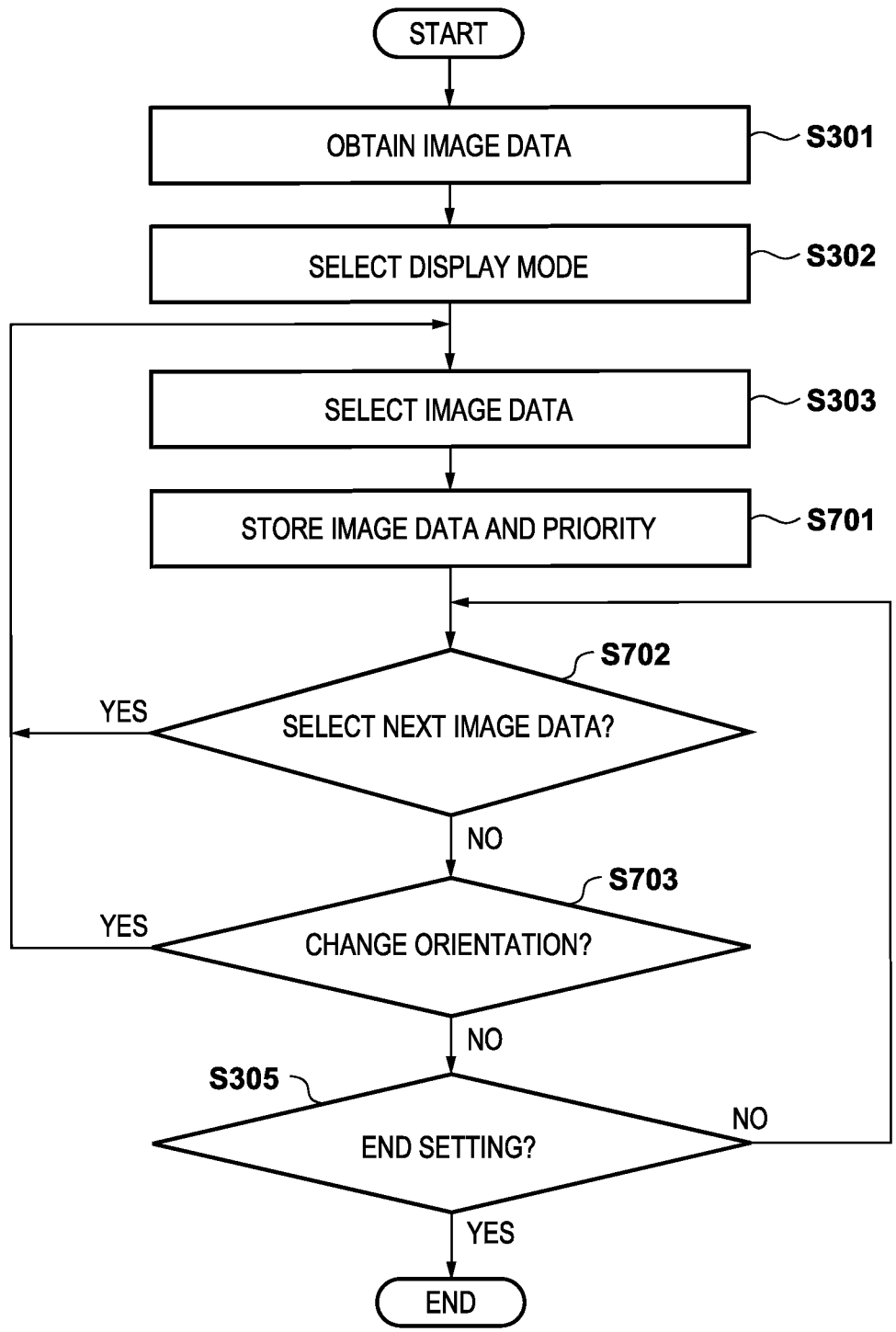
FIG. 7 is a flowchart of priority setting processing according to a second embodiment.

In the first embodiment, the case where one image data is set for each of the portrait display mode and the landscape display mode has been described. On the other hand, in the second embodiment, a case where a plurality of image data are set with priority for each display mode will be described.
Setting Display Priorities on Images FIG. 7 is a flowchart of priority setting processing performed by the electronic device 300 according to the second embodiment, and each process of this processing is performed by the control unit 11 by expanding a program stored in the non-volatile memory 13 into the work memory 14. Similarly to the first embodiment, the priority setting processing is executed when, for example, "set display priorities" is displayed as one of the menu options and this option is selected via the operation unit 15. In FIG. 7, since the processes of steps S301 to S303 and S305 are the same as those shown in FIG. 3, the same step numbers are assigned and the description thereof will be omitted.

When the display mode is selected in step S302, the process proceeds to step S303 and one of the image data held in the work memory 14 is selected. Then, in step S701, the image data selected first is displayed, and the information of the selected image data is set as priority 1 and stored in the work memory 14 in association with the display mode.

Then, in step S702, it is determined whether or not to select the image data of the next priority, and if yes, the process returns to step S303 and the above processes are repeated. Each time the process of step S303 is repeated, the priority is lowered in order.

When the selection of the image data is completed, in step S703, it is determined whether or not to change the display mode, and if yes, the process returns to step S303 and the above processes are repeated. For example, in the example shown in FIG. 4, when the portrait display mode is selected by touching the window 402 in the state of selecting the image data for the landscape display mode of the window 401, the display mode is changed.

If the display mode is not changed in step S703, the process proceeds to step S305, and the control unit 11 determines whether to end the priority setting processing. If an instruction to end the process is not issued, the process returns to step S702 and the above processes are repeated, and if an instruction to end the process is issued, the process ends.

FIG. 8 is a table showing an example of the setting contents set in the processing shown in FIG. 7. In FIG. 8, it is assumed that the image data A to E are held in the work memory 14 as the image data that can be set.

The display processing of the image to be displayed with priority in the second embodiment is basically the same as the processing explained with reference to FIG. 5 except that, in step S506, the image data obtained from the same image source as that of the image data having a higher priority is displayed among the image data that can be displayed, and thus the description thereof will be omitted.

As described above, according to the second embodiment, a priority order is given to a plurality of image data for each display mode and held. As a result, even if the image data cannot be acquired from the same image source as that of the image data with the highest priority when displaying the image data, the image data obtained from the same image source as that of the image data with the next highest priority can be displayed.

The priority may be set by the user, or may be automatically assigned according to the angle of view when an image is taken. For example, based on the size and the given posture information of the delivered image at the time of shooting, a high priority may be set to the image data shot with a vertically long angle of view in portrait display mode, and a high priority may be set to the image data shot with a horizontally long angle of view in the landscape display mode.

Third Embodiment

Next, a third embodiment of the present invention will be described.

Figure 9:
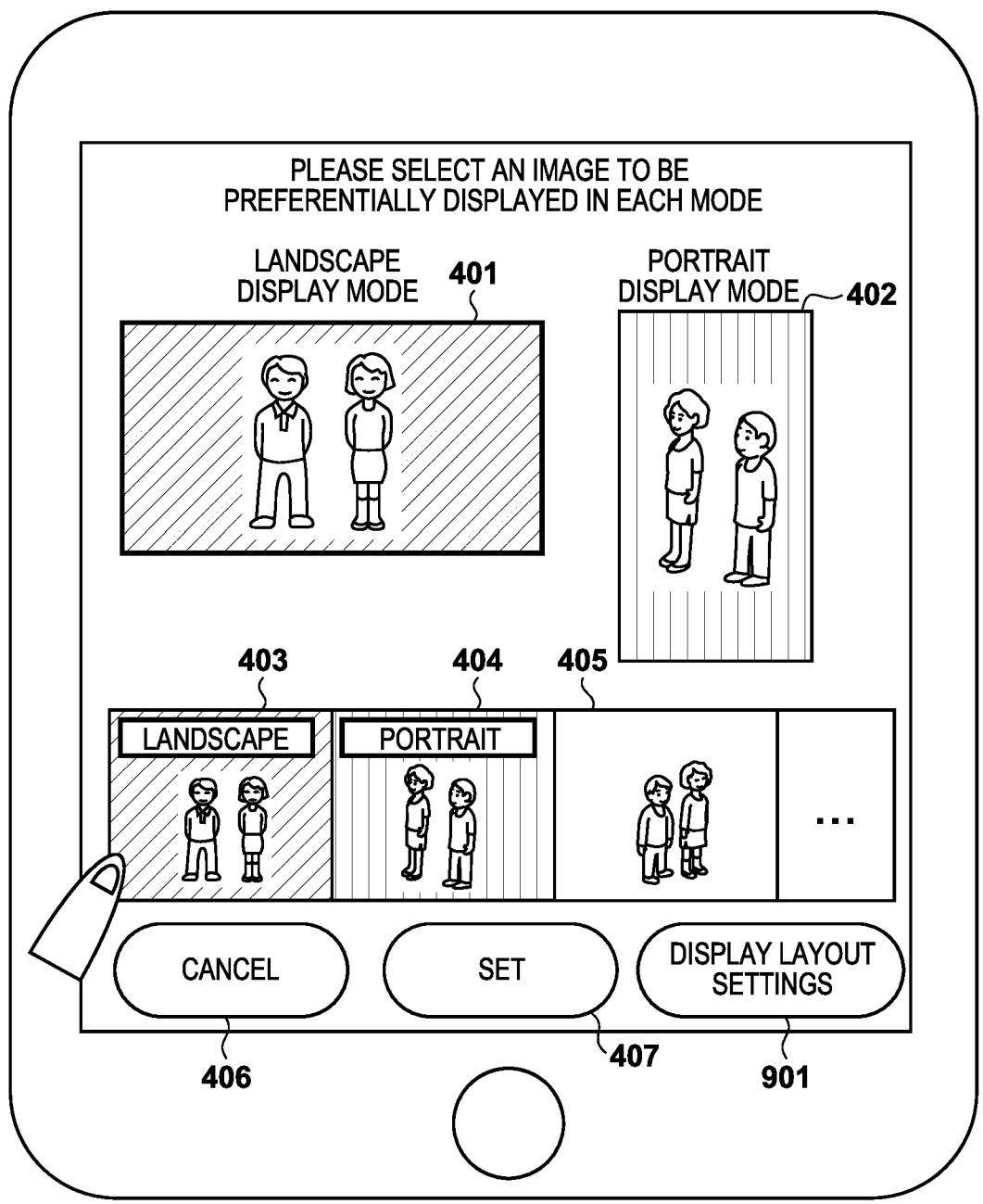
FIG. 9 is a diagram showing an example of a screen for priority setting processing according to a third embodiment.

The image data that can be displayed on one screen in each display mode is not limited to one, and a plurality of image data may be displayed at the same time. In the third embodiment, the display layout is set following the priority setting processing shown in FIG. 7 described in the second embodiment. Note that the display layout setting processing is executed, for example, in a case where the "display layout settings" button 901 shown in FIG. 9 is pressed using the operation unit 15, and the screen shown in FIG. 10A is displayed.

Display Layout Settings

Figures 10A, 10B:
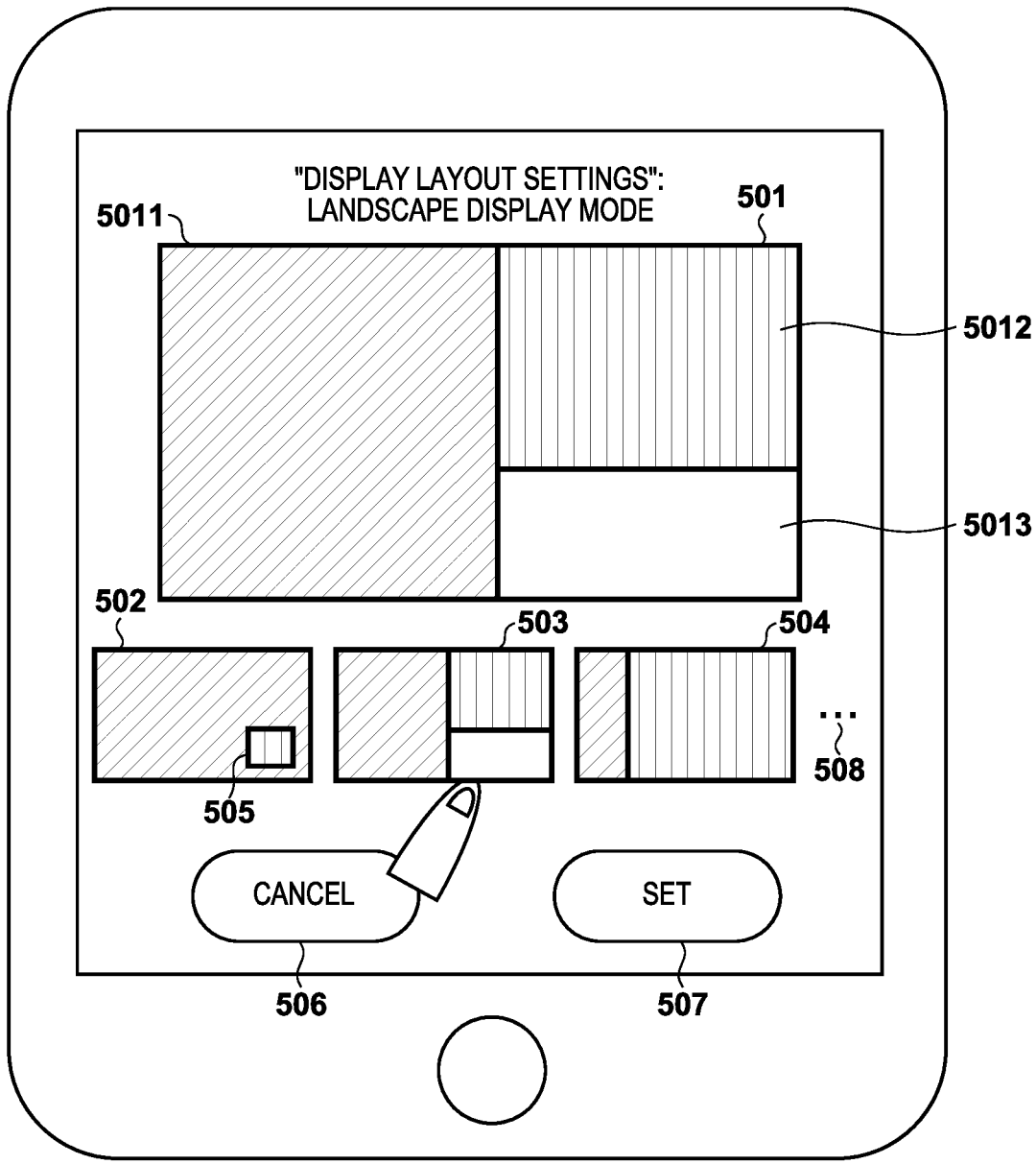
FIGS. 10A and 10B are diagrams showing an example of a display layout setting screen according to the third embodiment.

FIG. 10A shows a screen for selecting a display layout. Here, as an example, a screen for setting a layout when displaying a plurality of image data on one screen while the landscape display mode is selected in FIG. 9 is displayed.

Reference numeral 501 indicates the display layout which is currently selected. The user can select a layout from layout candidates 502, 503, 504 using the operation unit 15 (e.g., touch operation on the touch panel 16*a*). In the example shown in FIG. 10A, the case where the layout candidate 503 is selected is shown. The display layout may be a layout in which one screen is divided into a plurality of sections, such as the layout candidates 503 and 504, or a layout in which a display area for displaying one image data includes a second display area 505 for displaying other image data, such as the layout candidate 502.

In the third embodiment, the priority is given to each display area in the order of the size of the display area in each layout candidate, and whether each display area is in the portrait orientation or the landscape orientation is automatically determined according to the aspect ratio of each display area. Alternatively, the priority of each display area may be manually set by the user.

FIG. 10B is a table showing, as an example, the distinction between portrait orientation/landscape orientation of each of display areas 5011 to 5013 of the selected display layout 501, and an example of the priority order of each display area. In the third embodiment, when displaying image data, the image data is selected and displayed according to the display processing of image data described later with reference to FIG. 11 based on the priority shown in FIG. 8.

For example, since the display area 5011 has the priority 1 in the portrait orientation, the video data D is displayed there. Further, since the display area 5012 has the priority 1 in landscape orientation, the video data C is displayed there. The display area 5013 is the landscape orientation and is smaller than the display area 5012 and thus has the priority 2 in the landscape orientation, and the video data B is displayed there.

If a layout candidate is selected and a "Set" button 507 of FIG. 10A is pressed, the selected layout is held, and when a "Cancel" button 506 is pressed, the display layout setting is discarded, and the screen display returns to the screen of FIG. 9.

When the portrait display mode is selected in FIG. 9, layout candidates for dividing the window 402 are displayed.

Further, the layout candidates are not limited to the three displayed layout candidates 502, 503, and 504, and there may be four or more candidates. At that time, for example, a simplified display such as a mark 508 indicating that there are other layout candidates may be displayed, and in response to a swiping operation or the like, hidden other layout candidates may be displayed in the area where the layout candidates 502, 503, and 504 are displayed.

Displaying Image with Priority

Next, the display processing of the image data set to be preferentially displayed in each display area as described above will be described with reference to FIG. 11. Each process is executed by the control unit 11 expanding a program stored in the non-volatile memory 13 to the work memory 14. In the processing shown in FIG. 11, the same step numbers are assigned to the processes similar to the processes shown in FIG. 5, and the description thereof will be omitted as appropriate.

When the past orientation information of the electronic device 300 stored in the work memory 14 is overwritten with the latest orientation information of the electronic device 300 stored in the work memory 14 in step S503, the process proceeds to step S1101. In step S1101, the control unit 11 changes the display layout according to the latest orientation information of the electronic device 300 stored in the work memory 14.

In step S1102, the control unit 11 acquires the number of display areas from the information of the display layout stored in the work memory 14, stores it as a loop variable Num, and initializes a variable i to 0. Hereinafter, the processes of steps S1103 to S1106 are repeated while the variable i is smaller than the loop variable Num.

In step S1103, the control unit 11 increments the variable i. Then, in step S1104, among the plurality of display areas of the display layout, the display area having the highest priority among the display areas where the image data is not displayed is selected. Here, it is assumed that the larger display area is assigned with the higher priority.

In step S1105, with respect to the selected display area, the control unit 11 selects the image data with the highest priority among the image data which is/are not displayed in any of the display areas based on the priority shown in FIG. 8 according to the portrait/landscape orientation and the priority in each orientation shown in FIG. 10B.

In step S1106, the control unit 11 displays the image data obtained from the same image source as that of the image data selected in step S1105 in the display area selected in step S1104.

Then, in step S1107, if the variable i is equal to or greater than the loop variable Num, the process proceeds to step S507, and if the variable i is smaller than the loop variable Num, the process returns to step S1103 and the above processes are repeated.

Figure 11:
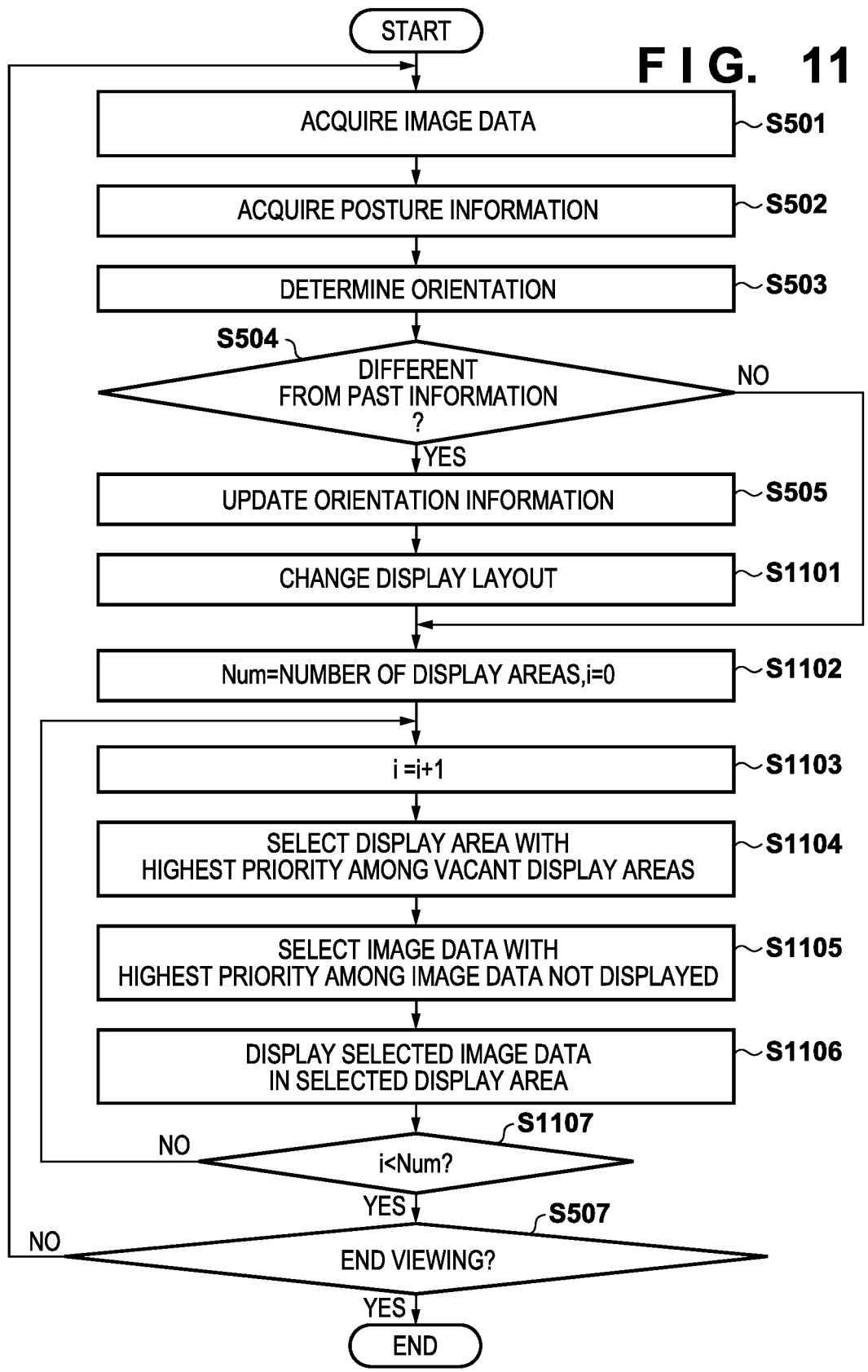
FIG. 11 is a flowchart of an image display processing according to the third embodiment.

An example of images preferentially displayed in the image display processing shown in FIG. 11 will be explained with reference to FIGS. 12A and 12B.

Figure 12A:
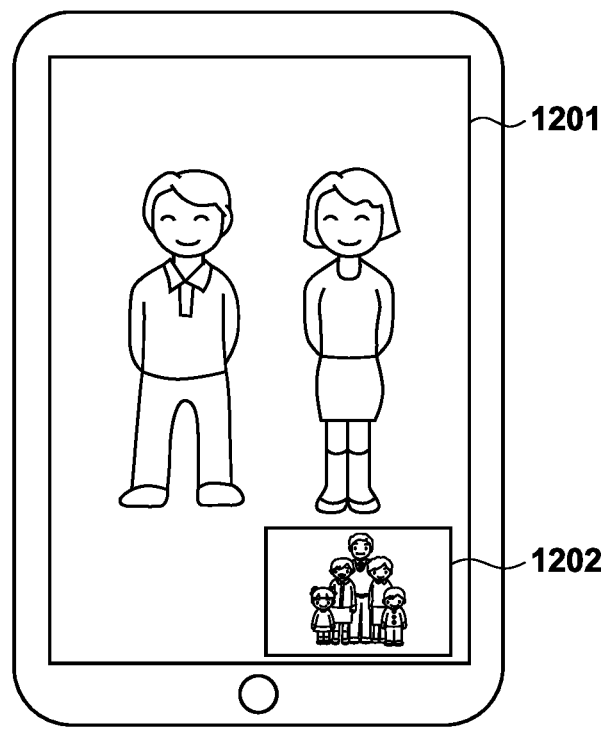
FIGS. 12A and 12B are diagrams showing examples of displayed images on a screen according to the third embodiment.
Figure 12B:
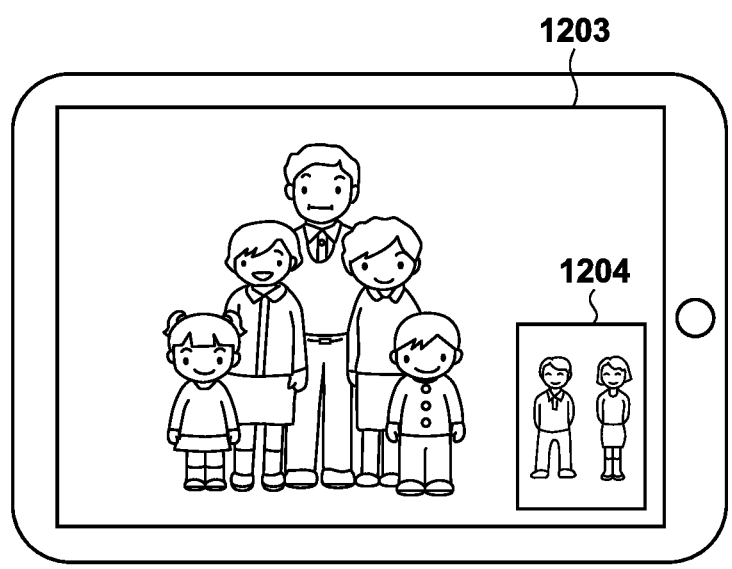

FIGS. 12A and 12B show examples of the image data displayed in a case where the display layout according to the layout candidate 502 is selected in the portrait display mode and in the landscape display mode, respectively, in the display layout setting described in the third embodiment.

As shown in FIG. 12A, when the portrait orientation is set as orientation information of the electronic device 300, the loop variable Num is set to 2 in step S1102. Then, through the processes of steps S1103 to S1106, the image data obtained from the same image source as that of the image data D having the priority 1 set for the portrait display mode as in FIG. 8 is displayed in a display area 1201. Further, in a display area 1202, image data obtained from the same video source as that of the image data C having the priority 1 set for the landscape display mode as in FIG. 8 is displayed.

If the orientation of the electronic device 300 is changed from this state to the landscape orientation (YES in step S504), the orientation information of the electronic device 300 is changed (step S505), and the display layout selected in the landscape display mode is acquired and set. (step S1101). Then, the variable Num is set to 2 in step S1102, and through the processes of steps S1103 to S1106, the image data obtained from the same video source as that of the image data C having the priority 1 set for the landscape display mode as in FIG. 8 is displayed in a display area 1203. Further, in a display area 1204, image data obtained from the same video source as that of the image data D having the priority 1 set for the portrait display mode as in FIG. 8 is displayed.

As described above, according to the third embodiment, even when one screen is divided into a plurality of display areas, it is possible to switch to desired image data to be displayed in conjunction with a change in the orientation of the screen of the terminal.

<Modification 1>

The priority of image data may be set for each layout candidate without using the priority order of image data for the display mode shown in FIG. 8.

FIG. 13 is a table showing the priorities of image data for the portrait orientation and the landscape orientation for each layout candidate, and is used instead of the priorities shown in FIG. 8. To set the image data with priority for each layout candidate, for example, in step S302 of the processing shown in FIG. 7, instead of selecting the display mode, each layout candidate shown in FIG. 10A is selected.

By setting the image data to be displayed preferentially in each layout candidate in this way, different image data can be preferentially displayed depending on whether the screen is not divided or divided into a plurality of display areas.

Fourth Embodiment

Next, a fourth embodiment of the present invention will be described.

In the fourth embodiment, various control methods for, while displaying image data, setting a display area for displaying another image data will be described.

Figure 14A:
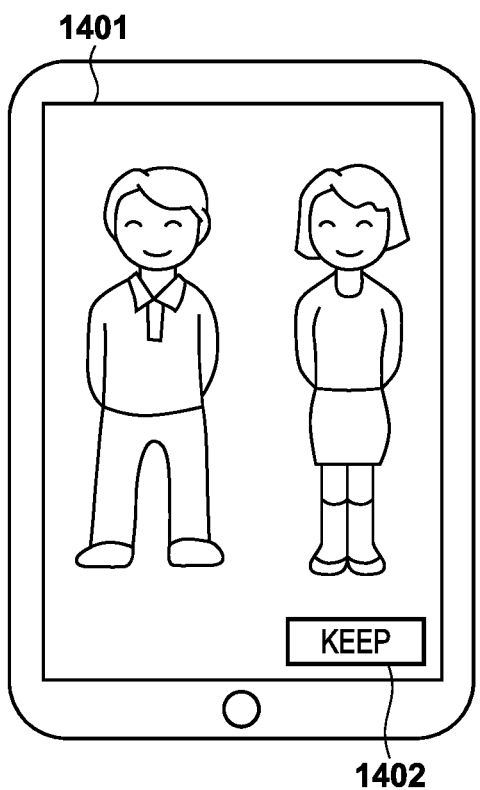
FIGS. 14A and 14B are diagrams showing examples of displayed images on a screen according to a fourth embodiment.
Figure 14B:
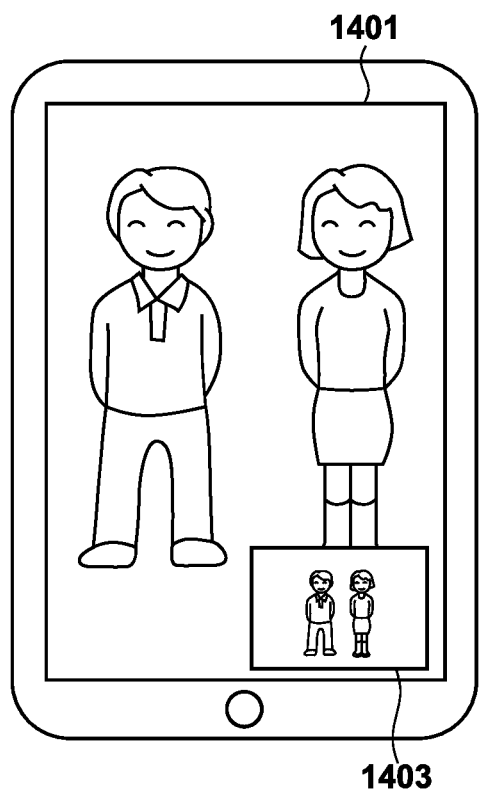

FIGS. 14A and 14B are diagrams showing an example of a display screen in the present embodiment. When displaying the image data set for the portrait display mode in a main display area 1401, a "KEEP" button 1402 is displayed as shown in FIG. 14A. Then, when the "KEEP" button 1402 is pressed, as shown in FIG. 14B, a sub display area 1403 is set within the main display area 1401, and the image data displayed in the main display area 1401 is displayed in the sub display area 1403.

In this state, if the orientation of the electronic device 300 is changed to the landscape orientation, images are displayed as shown in FIG. 12B, and it is controlled such that the image data set for the landscape display mode is displayed in the main display area 1203, and the image data displayed in the sub display area 1403 is continuously displayed in the sub display area 1204.

By controlling in this way, it is possible to easily specify the content distributed from the favorite video camera and continue to watch it while switching between the image contents such as TV programs distributed from a plurality of cameras.

The image data to be displayed in the sub display area may be set in accordance with an input from a stationary instruction member 15A and touch operation via the operation unit 15, or voice instruction input from the microphone 21.

Figure 15A:
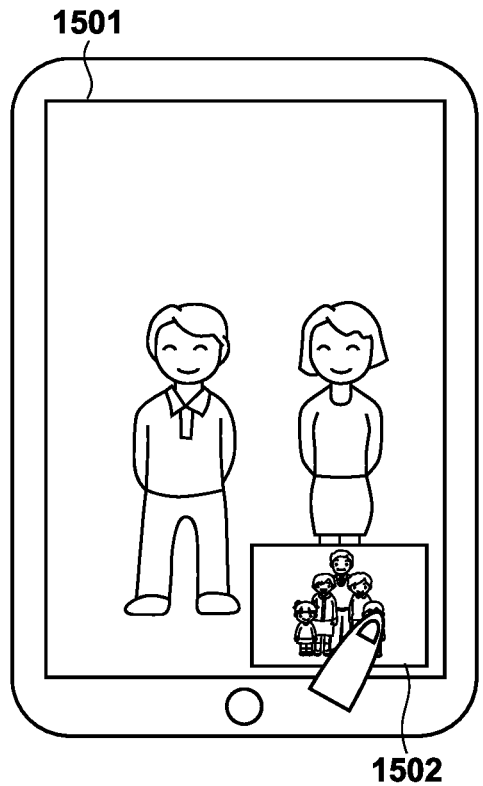
FIGS. 15A to 15D are diagrams illustrating a method of displaying image data according to the fourth embodiment.
Figure 15B:
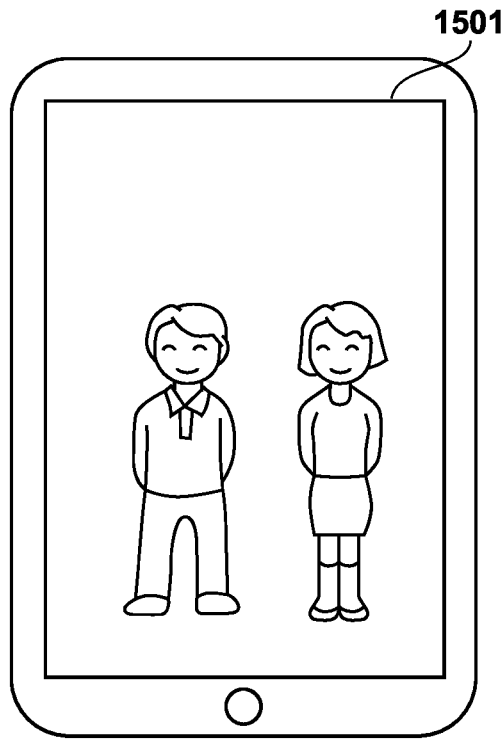
Figure 15C:
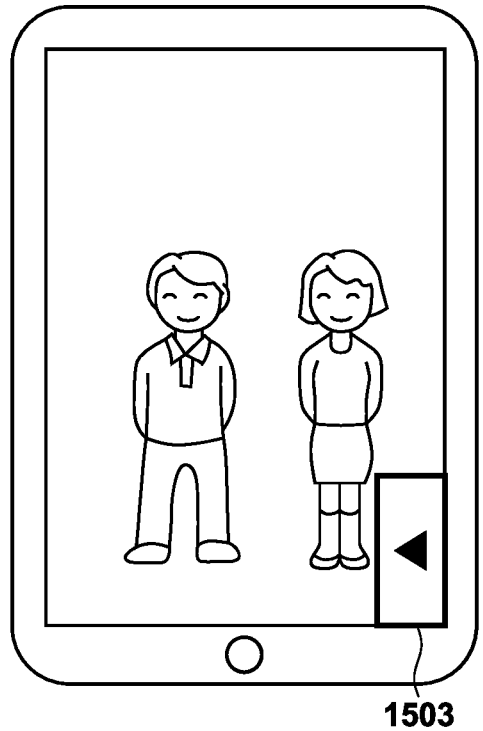
Figure 15D:
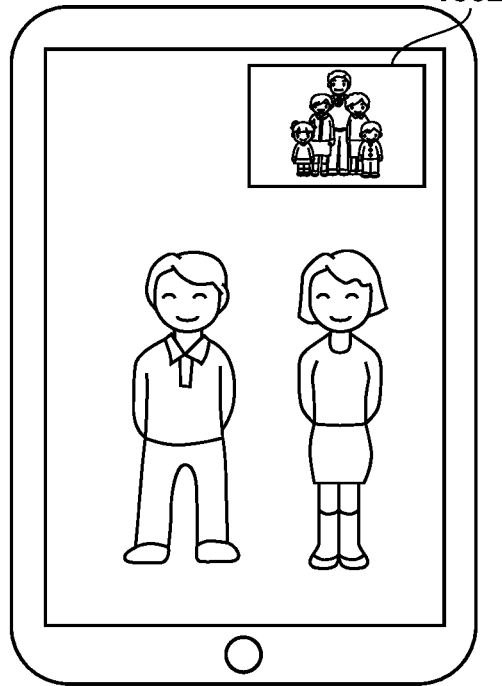

FIG. 15A is a schematic diagram when a sub display area 1502 is selected by a selection operation using the operation unit 15. In this way, when the sub display area 1502 is selected by an input operation using the operation unit 15, the sub display area 1502 may be hidden as shown in FIG. 15B, or a small icon 1503 may be displayed as shown in FIG. 15C, or the sub display area 1502 may be moved to another area as shown in FIG. 15D. By selecting the icon 1503, the sub display area 1502 is displayed as shown in FIG. 15A.

Further, the iconization and displacement of the sub display area 1502 may be automatically executed based on subject information of the display area 1501. Specifically, the control unit 11 refers to the subject information of the image data stored in the work memory 14, and determines whether or not the sub display area 1502 overlaps with the subject displayed in the display area 1501. If they overlap, the sub display area 1502 may be hidden as shown in FIG. 15B, iconized as shown in FIG. 15C, or moved to another area as shown in FIG. 15D, and if they do not overlap, the sub display area 1502 may continue to be displayed as it is. By doing so, it is possible to avoid a situation in which the sub display area 1502 covers the subject and the desired image cannot be viewed.

Figure 16A:
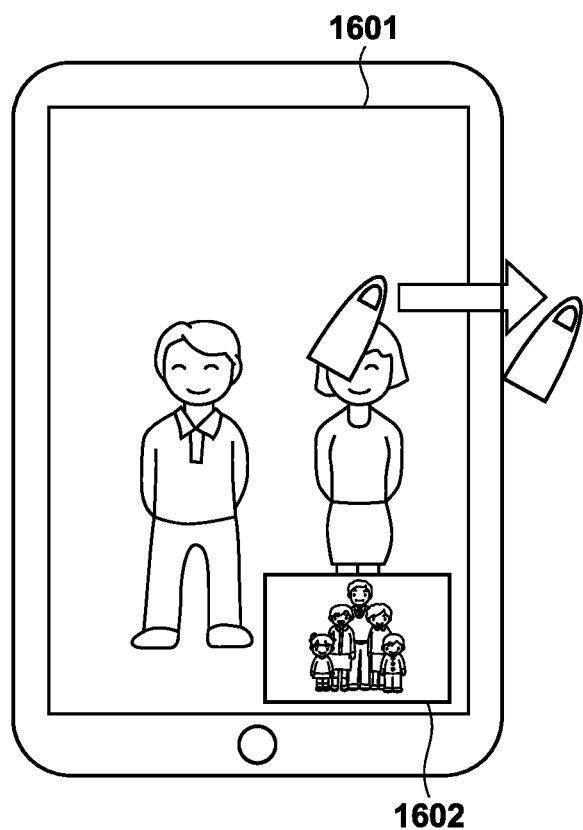
FIGS. 16A and 16B are diagrams illustrating a method of displaying image data according to the fourth embodiment.
Figure 16B:
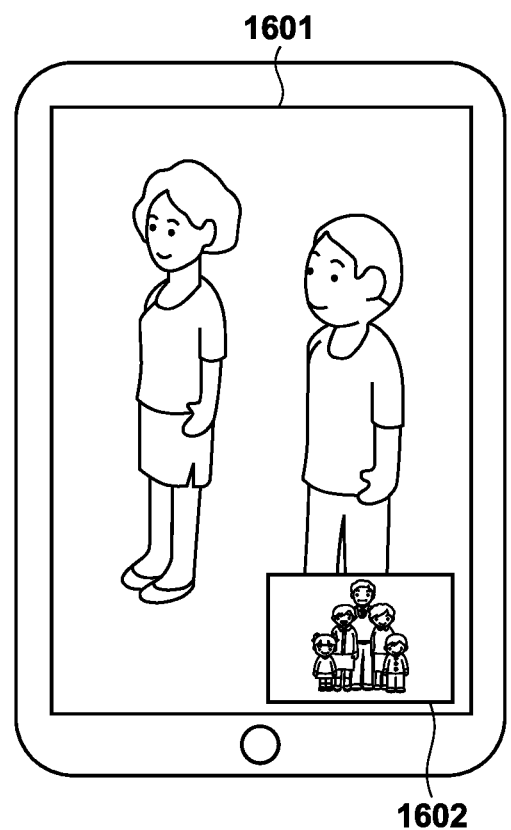

FIGS. 16A and 16B are diagrams showing an example of a changing process of image data displayed in each of a plurality of display areas, and the control shown below can be performed in a case where a plurality of image data are set with priority. The user can change the displayed image data in the main display area 1601 by performing an operation using the operation unit 15 or a touch operation such as a swipe operation.

Specifically, when a swipe operation in the right direction is performed while image data obtained from the same video source as that of the image data with the priority 1 is displayed in a main display area 1601, the image data to be displayed in the main display area 1601 is changed to the image data obtained from the same video source as that of the image data having the next priority 2 for the portrait display mode. In the example shown in FIG. 8, the image data obtained from the same video source as that of the image data D is changed to the image data obtained from the same video source as that of the image data C. At this time, if a swipe operation is performed in the sub display area 1602, it may be interpreted as an instruction to change the image data displayed in the sub display area 1602. Further, the process may be changed depending on the swipe direction. For example, if the swipe operation is in the right direction, the priority of the image data to be displayed may be increased, and if the swipe operation is in the left direction, the priority of the image data to be displayed may be decreased.

Although the method of switching the image data to be displayed on the display unit 16 based on the posture information of the electronic device 300 has been described so far, the subject of the image data may be determined and the audio data may be switched at the same time as the image data is switched.

FIG. 17 is a table for audio information in a case where the image data displayed in the main display area 1201 and the sub display area 1202 as shown in FIG. 12A are changed to be displayed in the sub display area 1204 and in the main display area 1203, respectively, as shown in FIG. 12B caused by the change in orientation of the display unit 16. The audio information to be output from the speaker 22 built in the electronic device 300 is controlled so that the ratio of the audio information of the image data displayed in the display area with the higher priority in the current orientation stored in the work memory 14 is high.

The audio information is not limited to that associated with the image data, and may be determined for each subject. Specifically, it may be controlled such that the audio data of each subject associated with the image data is received, and the sound from the subject in the image data displayed in the display area with the priority 1 may be output louder than other subject/subjects. By doing so, in a case where the image data showing the same subject is preferentially displayed, the sound from the subject can be heard loudly, so that the desired sound can be selectively heard.

As described above, according to the fourth embodiment, the image data can be switched by various methods, and the desired image data can be easily selected without complicated key operation or the like.

In the above-described embodiments, the cases where the present invention is applied to an electronic device such as a smartphone has been described as an example, however, the present invention is not limited to this example, and can be applied to any electronic device provided with a display unit and capable of determining the orientation of the terminal itself based on the information acquired from a posture detection unit. That is, the present invention can be applied to a camera, a personal computer, a PDA, and the like having an image capturing unit and an image reproduction function, Other Embodiments Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-067242, filed Apr. 12, 2021 which is hereby incorporated by reference herein in its entirety.

What is claimed is:

1. An electronic apparatus comprising:
a processor; and
a memory storing a program which, when executed by the processor, causes the electronic apparatus to:
acquire a plurality of images obtained from a plurality of different image sources;
store information about relationship between an orientation of a display device and at least one of the plurality of images in a storage;
detect an orientation of a display device; and
control the display device to display an image obtained from a same image source, among the plurality of different image sources, as that of an image associated with the detected orientation; and
a speaker,
wherein the information about relationship between one or more of the plurality of images and priority or priorities for each orientation of the display device is stored in the storage, and
wherein, in a case where a plurality of images are displayed in the display device, the controller sets a ratio of audio information associated with each of the plurality of images in accordance with priorities set to a plurality of display areas displaying the plurality of images and controls to output the audio data from the speaker.

2. The electronic apparatus according to claim 1, wherein the information about relationship between each orientation of the display device and one of the plurality of image is stored in the storage.

3. The electronic apparatus according to claim 1,
wherein the program when executed by the processor further causes the electronic apparatus to select an image with a highest priority from among images obtained from the same image source as that of the image associated with the detected orientation and capable of being displayed, and
wherein the display device is controlled to display the selected image.

4. The electronic apparatus according to claim 3 further comprising a touch panel provided on a surface of the display device,
wherein, in a case where a swipe operation is performed on the touch panel, wherein the program when executed by the processor further causes the electronic apparatus to change the image displayed in an area where the swipe operation is performed to an image with a higher priority or with a lower priority than the displayed image in accordance with a direction of the swipe operation.

5. The electronic apparatus according to claim 1, wherein the display device is controlled to simultaneously display a plurality of images on a screen of the display device and wherein the plurality of images are displayed in display areas with which are set a priority order.

6. The electronic apparatus according to claim 1, wherein the display device is controlled to simultaneously display a plurality of images on a screen of the display device and wherein the plurality of images are displayed in display areas with which are set a priority order, and
wherein the information about relationship between an orientation of each of the display areas and at least one of the plurality of images is stored in the storage.

7. The electronic apparatus according to claim 1, wherein, in a case where an instruction to keep an image displayed in a first display area of the display device is issued while the image is displayed in the first display area,
wherein the program when executed by the processor further causes the electronic apparatus to set a second display area within the first display area and to display the same image as that displayed in the first display area in the second display area.

8. The electronic apparatus according to claim 7, wherein, in a case where the orientation of the display device is changed,
wherein the program when executed by the processor further causes the electronic apparatus to keep the second display area and to display the image displayed in the first display area in the second display area.

9. The electronic apparatus according to claim 7, wherein, in a case where the second display area is designated,
wherein the program when executed by the processor further causes the electronic apparatus to iconize the second display area or hide the second display area.

10. The electronic apparatus according to claim 7, wherein the program when executed by the processor further causes the electronic apparatus to detect a position of a subject in the image displayed in the first display area and, in a case where the second display area overlaps with the subject, to iconize the second display area, hide the second display area or move the second display area to a position at which the second display area does not overlap with the subject.

11. The electronic apparatus according to claim 1, wherein the information is stored based on receiving at least either of a touch input or an audio instruction.

12. A control method of an electronic apparatus comprising:
acquiring a plurality of images obtained from a plurality of different image sources;
storing information about relationship between an orientation of a display device and at least one of the plurality of images in a storage based on an operation by an operation unit;
detecting an orientation of the display device; and
displaying on the display device an image obtained from a same image source, among the plurality of different image sources, as that of an image associated with the detected orientation,
wherein the information about relationship between one or more of the plurality of images and priority or priorities for each orientation of the display device is stored in the storage, and
wherein, in a case where a plurality of images are displayed in the display device, the controller sets a ratio of audio information associated with each of the plurality of images in accordance with priorities set to a plurality of display areas displaying the plurality of images and controls to output the audio data from a speaker.

13. A non-transitory computer-readable storage medium, the storage medium storing a program that is executable by the computer, wherein the program includes program code for causing the computer to function as an electronic apparatus comprising:
an acquisition unit that acquires a plurality of images obtained from a plurality of different image sources;
a display device;
a storage that stores information about relationship between an orientation of the display device and at least one of the plurality of images based on an operation by an operation unit;
a detector that detect an orientation of the display device; and
a controller that controls the display device to display an image obtained from a same image source, among the plurality of different image sources, as that of an image associated with the detected orientation,
wherein the information about relationship between one or more of the plurality of images and priority or priorities for each orientation of the display device is stored in the storage, and
wherein, in a case where a plurality of images are displayed in the display device, the controller sets a ratio of audio information associated with each of the plurality of images in accordance with priorities set to a plurality of display areas displaying the plurality of images and controls to output the audio data from a speaker.

* * * * *